Patented July 11, 1944

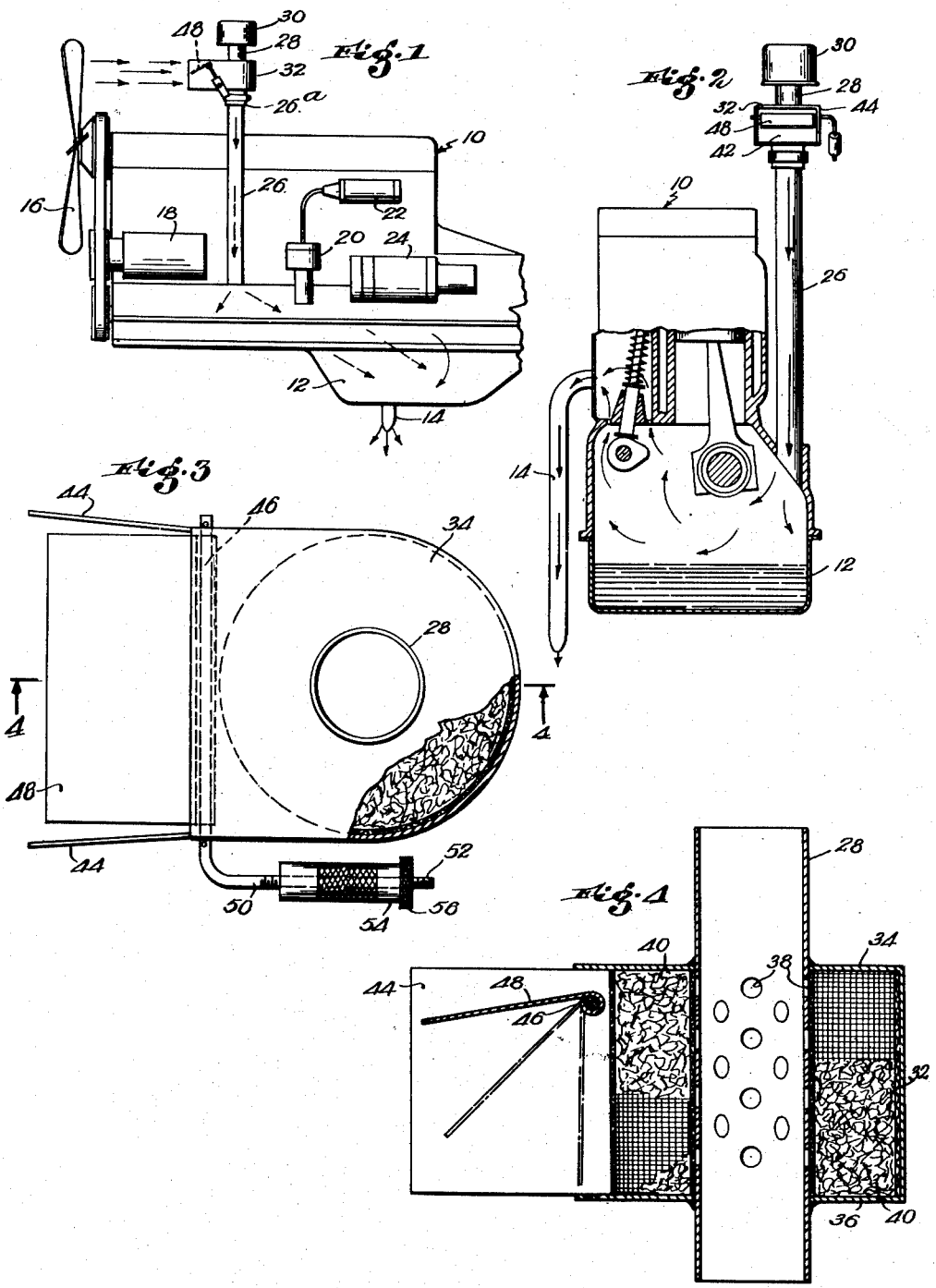

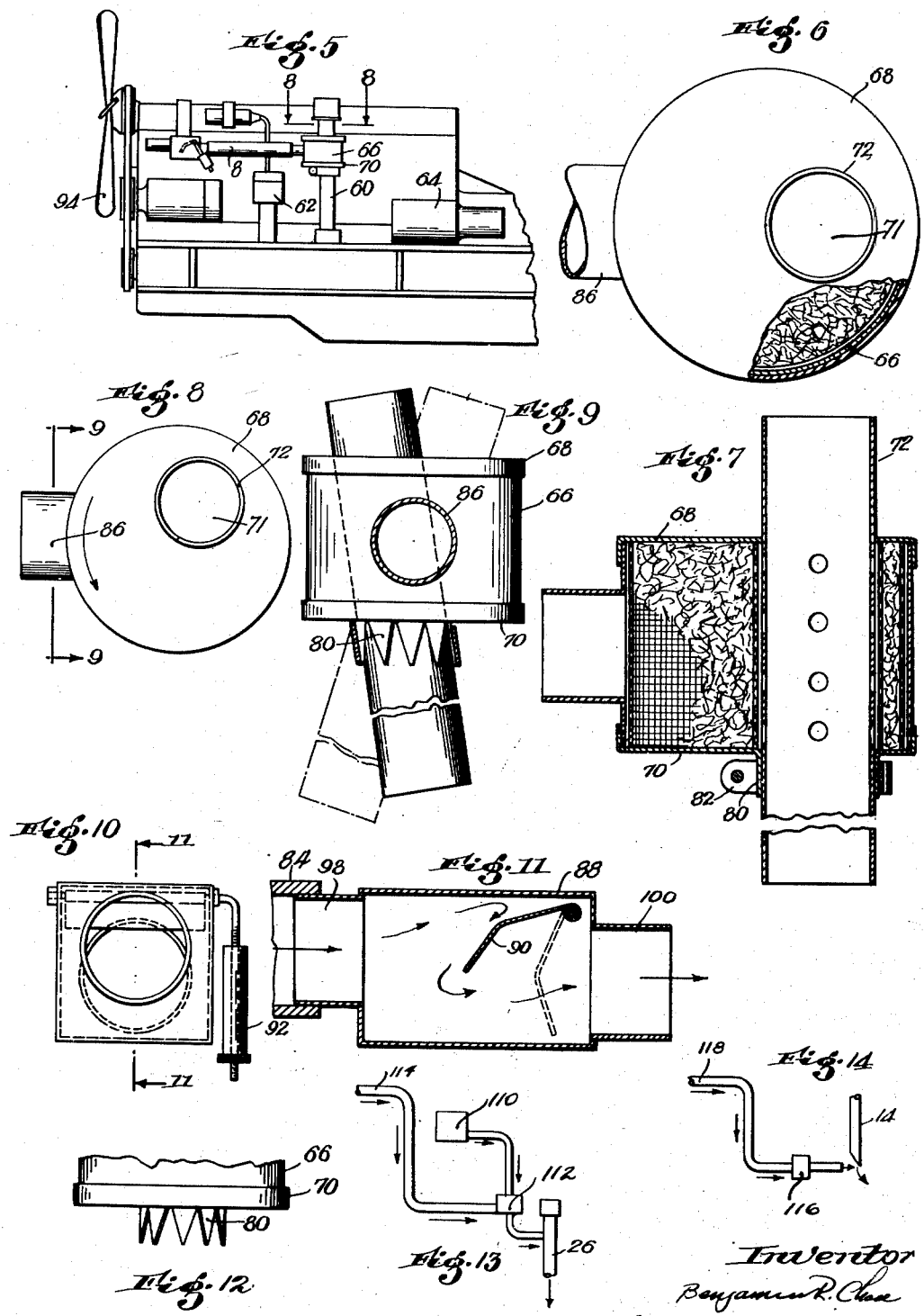

2,353,478

UNITED STATES PATENT OFFICE 2,353,478

LIQUID SHAFT SEAL

Harry E. La Bour, Elkhart, Ind.

Original application March 17, 1939, Serial No. 262,339, now Patent No. 2,297,001, dated September 29, 1942. Divided and this application January 7, 1942, Serial No. 425,836

(9 Claims. (Cl. 286—9)

My invention relates to liquid seals for shafts and the like. In various devices it is desirable to extend a rotatable shaft through a wall upon opposite sides of which it is desired to maintain a difference in pressure or a difference in the composition of the fluid mediums. The present invention has general utility, but it has particular value in self-priming centrifugal pumps as will be apparent from the following specification. While I have illustrated the invention as embodied in a self-priming centrifugal pump, that is by way of illustration and I do not intend to limit the invention to the specific use nor to the details of the specific pump shown.

A liquid seal is desirable in a pump of this class, particularly when the shaft must operate at high speeds or when the liquid being handled is corrosive to the shaft surface or to the composition of the packing.

In the use of a liquid shaft-seal it has been found that the liquid tends to be thrown away from the shaft by centrifugal force, thereby reducing the effectiveness of the seal. This is caused by the action of the water in adhering to the shaft upon contact with it, but being cast off in a tangential direction by the centrifugal force created by the whirling shaft. Then there is a tendency for a path for air to be formed along the shaft resulting in pressure breaking through the weak liquid seal. For satisfactory operation, liquid must be constantly present and must completely fill the cross section of the gap between the shaft and the sleeve or casing.

According to the present invention, I have provided a novel method of compelling the liquid to remain in engagement with the shaft and completely fill the cross section of the gap between the shaft and the surrounding sleeve or casing elements at one or more points, thus satisfactorily overcoming the usual action caused by the centrifugal force of the rotating shaft. This desired result is obtained by introducing liquid through ports into the gap between the shaft and sleeve or casing in a direction tangential to the direction of rotation of the shaft. The entering liquid, in passing into the gap, is forced into narrow converging passageways formed between the walls of the above mentioned ports and the shaft. The rotating shaft also tends to drag the liquid by adhesion and cohesion through these passageways. The restriction thus offered to the liquid's flow by the narrow passageways causes it to be squeezed and consequentially to seek escape. The only other path open to it is upward and downward along the shaft in the gap between the shaft and the sleeve or casing. In escaping from the restricted passageways the liquid is so squeezed or forced that it spreads throughout the full cross section of the gap, i. e., completely about the shaft, for a limited but sufficient distance both above and below the entry ports. Of these two sealed areas in the gap it is the seal between the enclosed chamber and the entry port which is most important, for though the other sealed area would prevent pressure breaking through along the shaft, it would not prevent any pressure break-through which might come along the entrance passage of the liquid itself.

The pump herein illustrated and described, to show a practical application of the seal, is suitable for and intended to be operated at speeds of the order of 2400 to 3600 R. P. M., and can be operated at higher speeds if necessary. Under such speeds, the problem of centrifugal force and diminishing of the pressure of the sealing liquid at the surface of the shaft becomes acute. However, the invention is not limited to pumps of high shaft speed, as the advantages appear at all practicable pump speeds and in uses other than in pumps.

Another consideration involved in the production of a satisfactory liquid shaft seal is the requirement of a certain and continuous supply of liquid to the gap between the shaft and the surrounding sleeve or casing. This requirement too is met by my invention as will shortly be illustrated.

A further problem which I have encountered in the development of the liquid type of shaft seal is the necessity for certainty of disposal of the necessary outflow or wastage of sealing liquid. Absolute assurance that the overflow of liquid cannot, under any circumstances, rise into the bearings or driving means of the shaft must be had, and to solve this difficulty appropriate disposal means have been provided as will appear more fully hereinafter.

Though my liquid shaft seal is hereinafter described in conjunction with a self-priming centrifugal pump, this is in no way to be considered a limitation upon the scope of my invention, for it is readily adaptable to other devices and uses.

In the accompanying drawings, which form a part of the present specification and in which like reference numerals refer to like parts, Figure 1 is a vertical section along the lines 1—1 of Figure 2, through a self-priming centrifugal pump employing my liquid shaft seal;

Figure 2 is a cross-sectional view along the lines

2—2 of Figure 1, of the same self-priming centrifugal pump employing my liquid shaft seal;

Figure 3 is a diagrammatic representation, in the same plane as the section of Figure 2, of the theoretical free path of a particle of liquid assuming inability to escape axially of the shaft, i. e., in a direction normal to the plane of the paper; and Figure 4 is a vertical cross-section along the lines 4—4 of Figure 3 diagrammatically representing (not to scale) the liquid seal produced along the shaft.

The present application is divisional of my copending application Serial No. 262,339, filed March 17, 1939, now Patent No. 2,297,001, issued September 29, 1942, to which reference may be had for a full disclosure of the operation of the pump as a self-priming centrifugal pump as such.

The self-priming centrifugal pump in which my liquid shaft seal is employed comprises the following main parts: a main body casting 1, an impeller 2, an impeller housing plate 3, and a closure plate 4 which forms not only a closure for the main body casting 1 but also completes the impeller housing for the impeller 2. A bearing bracket 5 which supports the impeller shaft 6 is mounted on the upper portion of the main body casting 1. The bearing bracket is connected to the motor frame (not shown) and it carries an antifriction bearing houbsing 5' for supporting the shaft 6.

The above described parts define three main coaxial chambers, namely, the impeller chamber 7, the discharge chamber 8, and an inlet chamber 9 through the longitudinal center of which passes the impeller shaft 6 with its liquid seal. An outlet passageway 10 communicates with the chamber 8, and an inlet passageway (at the opposite side of the pump from duct 10 and in line with the same and therefore, not shown) communicates with the inlet chamber 9. During priming the discharge chamber 8 serves as a gas and liquid separator. It serves also as a trap to retain liquid when the pump stops. Chamber 8 surrounds the impeller chamber 7 and communicates therewith by pairs of throats 29 and 30. Inlet chamber 9 communicates with the impeller chamber 7 through the eye or inlet opening 12. Throats 29 discharge tangentially into the separator 8. During priming, throats 30 provide a return flow from the separator 8 to the impeller housing 7 and then, after priming, serve as auxiliary outlets from the impeller housing into the discharge chamber (separator) 8.

I shall now describe the liquid shaft seal in conjunction with the above structure. There is a tubular extension 21 formed integrally with the main body casing 1 which provides a barrel for housing a liquid seal sleeve 22 which surrounds the shaft 6. This barrel 21 is divided by an inwardly extending flange wall 23 into two functionally separate chambers, namely, the upper or drain chamber 24 and the lower or liquid supply chamber 25. A suitable packing 26, disposed in an annular pocket or recess in flange 23, tends to maintain a substantially tight joint with the sleeve 22 so as to seal off the two chambers 24 and 25 from each other. Absolute tightness at this joint is not essential.

The lower chamber 25, which is a liquid supply chamber for the liquid shaft seal, is provided with two adjacent ducts 56 and 57 (see Figure 2) the walls of which may be formed integral with the main body casting as by forming cored passageways. The walls of the tubular inlet passageway 56 extend out to the outer peripheral wall 13, where an opening is provided which permits inspection and cleaning of the duct 56. This opening is normally closed by the pipe plug 58. A similar opening through the wall 13 (shown in Figure 1) above the pipe plug 58 is closed by a pipe plug 59. This opening 60 is for initially filling the pump for operation.

The supply passageway 56 opens downwardly at the opening 62, so that the duct may be supplied with liquid even at a minimum of liquid level in the separator space 8. The direction of opening is optional. The opening 62 is substantially non-clogging and it opens at the point where the liquid is densest and, during priming, has the maximum swirl. The swirling of liquid in the separator 8 tends to keep the entry port 62 clear. Since the size of the duct 56 is of such a diameter as to feed more liquid to the liquid supply chamber 25 than can be used in the liquid shaft seal, the passageway 57 is provided as a liquid overflow or return passageway from the liquid supply chamber surrounding the sleeve 22. The supplying of this excess of liquid for the seal is desirable and not a wasteful action since it prevents a shortage of sealing liquid and consequent possible break through of pressure. It keeps pocket 25 full of liquid and tends to prevent sediment settling in the pocket.

The liquid sealing sleeve is provided with an annular shoulder 63 at its lower end, and this flange is drawn against the bottom wall of the tubular extension 21 to form a tight connection by means of the threads at the upper end of the sleeve 22, these threads 64 being engaged by the nut 65, which nut has engagement with the bottom wall of a pocket 27 to hold the sleeve 22 in place. The nut 65 is internally channeled at 66 to cooperate with the slinger ring 67 which is slipped onto the upper end of the shaft 6. The nut 65 has openings 68 by which any liquid thrown off by the slinger ring may drain into the bottom of the pocket 27 and thence flow to the outside of the main body casing 1 through an open trough or channel 39 to the opening 46 and be conducted off through the drain pipe 44.

The sleeve 22 forms a tight joint with the lower wall of the tubular extension 21 as by means of a flanged head 63, and it forms a substantially tight connection with the flange 23 by virtue of the packing 26 above described, so that the liquid supply chamber 25, which is put under discharge pressure when the pump operates to pump liquid, will be substantially liquid tight. Obviously, the details of securing the parts together and of securing the tight relationship above referred to may, optionally, be varied.

The sleeve 22 is bored to fit the shaft 6 without gripping it. That is to say, there is a small clearance between the bore of the sleeve 22 and the shaft 6. This clearance is a small annular gap which is made so small as to constitute a material restriction to liquid flow but which would not exclude entry of gas or air if no sealing liquid were supplied. A few thousandths of an inch clearance may be provided, depending upon the character of the liquid to be pumped, the entrained solids, etc. Near its upper end, and registering with the discharge or overflow pocket 24, there are in the sleeve 22 a series of slots or windows 70 and the inside of the bore is relieved at these windows 70. Any liquid coming along the shaft 6 and entering the relief pocket at the windows 70 is free to flow outward radially into the chamber or pocket 24 in the tubular extension 21 and to escape to waste through the tube 40 and the pipe 44. Liquid tending to creep upwardly along the shaft 6 past the relief pocket 24 and windows 70 must pass, first, the restricted gap in the upper end of the sleeve and then it will encounter the slinger ring 67, where it will be thrown off within the surrounding slinger groove 66 in the nut 65.

Within the supply pocket 25 the sleeve 22 has a relief groove 72 communicating with the windows 74. A shallow relief groove 73 may be cut in register with the inlet passageways 75. This groove is optional. The lower supply groove 73 communicates with a series of tangential inlet passageways 75 (see Figures 2 and 3) which permit liquid to come into contact with the shaft, moving substantially tangentially in the direction of rotation of the shaft 6. The liquid contacting the shaft adheres thereto momentarily and is dragged, by rotation of the shaft, into a narrowing space provided by the inclined walls 90 of the passageways 75 which lead the liquid against the surface of the shaft. In effect, the shaft tends to wrap itself up in liquid by dragging the liquid into wedging engagement with itself along the inclined walls 90 of the duct or passageway 75. The result is that there is maintained a very definite pressure of liquid against the shaft. In fact, the shaft and the cooperating inclined passageways constitute, in effect, a small multiple pump, forcing liquid inwardly into engagement with the cylindrical surface of the shaft and providing an excess of pressure at the surface of the shaft which helps form a very effective seal. The plenum of liquid pressure along the surface of the shaft produced by this arrangement makes it possible to provide a relatively short liquid seal of great effectiveness. Heretofore, attempts to seal with liquid have encountered the marked difficulty of maintaining the liquid in firm contact with the surface of the shaft all the way around it because of the centrifugal effect of the shaft in throwing the liquid away from itself. The higher the speed, the greater has been the tendency to discharge the liquid away from the shaft, and suction would tend to strike down along the shaft even though liquid were supplied in abundance.

This can be seen particularly if the shaft is slightly eccentric with respect to the surrounding sleeve with which a liquid seal is to be maintained, for there would be a crescent-shaped lacuna or passageway left open between the shaft and the rotating liquid in the sleeve if there were any lack of concentricity between the two.

In the arrangement which I have shown (see particularly Figure 2), the higher the speed of the shaft the greater the velocity effect which occurs in driving the liquid into the narrowing space between the wedge-shaped part of the sleeve and the surface of the shaft.

Now the wedging action of liquid at each of the inclined vanes produces a longitudinally extending area of positive liquid pressure. This pressure tends to act in all directions (Pascal's law), and since it is restrained circumferentially of the shaft it tends to force liquid endwise into the gap. These ports and their inclined spaces are close enough to each other and have an effect sufficiently far in circumferential direction to produce the effect of a complete circumferential ring of pressure at both the upper and the lower ends of the ports 75. That is to say, in effect there is a pump forcing liquid into the gap between the shaft 6 and the sleeve 22, both in an upwardly and in a downwardly direction from the region of the ports 75 which thereby produces the two desired positive liquid sealing rings between the sleeve 22 and the impeller shaft 6.

Since this pumping effect produces a plenum of pressure at the surface of the shaft, there is a tendency for liquid to be discharged longitudinally along the shaft through the clearance. Any downward discharge returns to the inlet chamber 9 where it will be put back into service again. In order to avoid an excess of discharge along the shaft in the upward direction, where it would be wasted, I have provided, at a point slightly above this liquid wedging arrangement, the relief windows 74 which permit excess pressure at the surface of the shaft to be relieved and to flow back into the liquid supply pocket 25. Obviously this latter is an expedient which, while advantageous, is not essential to securing the wedging action against the surface of the shaft for producing the sealing effect. A restriction against free escape of liquid in the upward direction is needed to get the maximum downward pressure.

The arrangement above described may obviously be varied in detail, but the wedging of the liquid against the shaft around the same has proven highly effective, and maximum suction which the pump may attain by virtue of its pumping and self-priming action is unable to produce any gas leakage along the shaft. I therefore consider the above novel arrangement of forcing liquid against the surface of the shaft to provide a liquid seal to be of importance, and a marked advance in the art.

It will be observed that I have disposed the liquid sealing sleeve at as low a point as possible along the shaft length 6. It is desirable to have the liquid flow by gravity into the supply chamber 25 so that the sealing effect may be initiated the moment the shaft begins to rotate. In order to bring the bearing support sleeve 5 as far down the shaft as possible, the sealing sleeve must be made as short as possible in order to produce the minimum overhang or outboard length of the shaft 6.

The liquid seal sleeve 22, and particularly the ports 75 and the sealing portion of the sleeve below said ports 75, is disposed below the normal trapped level of liquid in the pump when the pump stops. It is to be observed that as soon as the impeller is rotated the liquid is withdrawn from the trap and discharged into the separator. This raises the level in the separator and produces a swirling of liquid in the separator, producing dynamic separation of gas from the liquid, and insuring that the level will be above the bottom of the ports 75, so that a liquid seal may be maintained on the lower end of the sleeve. For best results, the liquid should be at a high enough head to insure filling the ports 75 and then the pumping effect of the shaft 6 and said ports 75 is insured. In earlier forms of this seal I have faced the inlet opening 62 for the inlet passageway horizontally against the direction of rotation or swirl of liquid in the separator, so as to cause an impacting of the moving liquid upon said opening. It then acts as a pitot tube to transmit liquid pressure to the chamber 25. However, that construction has a greater tendency to conduct entrained solid into the chamber 25.

Figure 3 diagrammatically shows the wedging of the liquid against the shaft 6 by indicating how a particle of liquid would tend to act in relation to the walls 90 and the shaft 6. The indicated path of this particle M is a representation of the action of the mass of the liquid forming the seal. The particle M enters the supply chamber 25 after flowing up the supply duct 56 (as described in Fig. 1) because the rotation of the shaft 6 and impeller 2 has sent the particle M into and along this duct 56 with the other particles that form the mass of liquid. From the supply chamber 25 the particle M enters one of the ports 75 and continues along the path indicated by the line and arrow heads of Fig. 3. Its first contact is with the shaft 6 which is rotating in a clockwise direction. It adheres to the surface of the shaft momentarily but is almost immediately cast off from the shaft in a tangential direction whereupon it impinges upon one of the walls 90. The angle of rebound from the wall is equal to the angle of incidence. The particle M comes in contact with the shaft 6 again, and is again cast off tangentially to a second wall 90 whereupon the rebounding and subsequent tangential throws continue to pass the particle all around the shaft.

It is to be noted that particle M is squeezed or dragged through the small gaps between the shaft 6 and walls 90 along with other particles. These particles, it may be assumed, entered the ports 75 but were subsequently crowded through the small gaps which are many times smaller than the size of the entry ports. This causes the liquid pressure against the shaft, which we have spoken of above. Of course, the pressure against the shaft is less between the narrow gaps than right at them, but this does not allow any break through of pressure as I shall now explain.

In addition to the action of the shaft 6 in driving and wedging the liquid against itself, the restriction offered to the liquid at the small gaps is such that the liquid is squeezed out in all directions in trying to find a free pathway for itself. Since the circumferential path is so filled with liquid under pressure at the region of the approach of inclined surfaces 90 to the surface of the shaft 6, the liquid is forced longitudinally of the shaft at these regions of pressure into the annular gap between the shaft 6 and sleeve 22 both above and below that portion of the sleeve 22 which houses the entry ports 75.

Figure 4 indicates diagrammatically a vertical cross section along the lines 4—4 of Figure 3, and shows this liquid seal 99 above and below the entry ports 75 and between the shaft 6 and sleeve 22. The crests on this liquid seal tend to occur above and below the narrow gaps between the walls 90 and shaft 6 where the liquid is squeezed the most. The fact that the liquid spreads in all directions when squeezed, accounts for the complete ring of sealing liquid between the shaft and sleeve above and below the entry ports 75 which thus excludes a break-through of pressure into the impeller chamber. It may be noted that concentricity of the shaft and sleeve is desirable but not essential.

Now I have described the liquid shaft seal in a self-priming centrifugal pump where the shaft is vertical and where the level of the liquid is so trapped within a chamber as to help seal the lower end of the shaft at all times. But it is to be remembered that the above described use is merely one specific illustration of the use of my invention and is not to be taken as a limitation upon it. The shaft and seal, for example, could be horizontal or at an angle with the horizontal instead of vertical; other suitable liquid supply means could be used; there would not need to be a constantly present supply of trapped liquid around one end of the shaft since the supplying of liquid could begin before, at or after the starting of the shaft for service; and many other adaptations and changes could be made without departing from the spirit or scope of my invention as is outlined in the appended claims.

I claim:

1. A liquid shaft seal comprising a shaft, a sleeve embracing but not fitting against said shaft, said sleeve comprising a plurality of entry ports for introducing liquid into engagement with the surface of the shaft, said shaft and each of said ports providing a tapering space into which the friction of the shaft with the liquid drags the liquid in the direction of rotation of the shaft into wedging engagement between a part of the sleeve and the shaft.

2. A liquid shaft seal comprising a shaft, a sleeve embracing but not fitting against said shaft, said sleeve comprising a plurality of entry ports for introducing liquid into engagement with the surface of the shaft, said shaft and each of said ports providing a tapering space into which the friction of the shaft with the liquid drags the liquid in the direction of rotation of the shaft into wedging engagement between a part of the sleeve and the shaft, and entry and exit ducts cooperating with said sleeve to provide a circulation of liquid to and from the part of the sleeve having said entry ports.

3. A liquid seal for a shaft comprising a barrel surrounding the shaft and having an intermediate annular web dividing the inside of the barrel into upper and lower chambers, a sealing sleeve seated in the bore of the barrel, said sleeve being adapted to embrace but not grip the shaft to be sealed, ducts connected to said chambers for supplying and evacuating sealing liquid, said sleeve having a series of liquid supply passages lying in a common transverse plane, said passages having walls extending substantially tangent to the inner bore whereby liquid by its frictional engagement with the shaft is dragged in the direction of rotation of the shaft into wedging engagement between the shaft and the sleeve.

4. A liquid seal for a shaft comprising a barrel surrounding the shaft and having an intermediate annular web dividing the inside of the barrel into upper and lower chambers, a sealing sleeve seated in the bore of the barrel, said sleeve being adapted to embrace but not grip the shaft to be sealed, ducts connected to said chambers for supplying and evacuating sealing liquid, said sleeve having a series of liquid supply passages lying in a common transverse plane, said passages having walls extending substantially tangent to the inner bore whereby liquid by its frictional engagement with the shaft is dragged in the direction of rotation of the shaft into wedging engagement between the shaft and the sleeve, there being liquid relief ports between the inside of the sleeve and a part of the same chamber in which said liquid supplying passages lie to prevent the forcing of liquid toward the free end of the sleeve.

5. In combination, a shaft, a closed chamber having a wall through which said shaft passes and to which it is to be sealed, a barrel joined to said wall, a sealing sleeve supported in said barrel, said sleeve embracing but not gripping said shaft, said barrel forming a chamber about a portion of the sleeve, said sleeve having ports with walls substantially tangential to the surface of the shaft, said ports opening at their outer ends into said chamber and at their inner ends into the space between the shaft and the bore of the sleeve, said shaft upon rotation tending to drag liquid in the direction of the rotation of the shaft into wedging engagement between the shaft and the wall of the sleeve, and means to admit liquid to the chamber, one end of the sleeve opening inside the aforesaid wall and the other end opening outside the wall.

6. In combination, a shaft, a closed chamber having a wall through which said shaft passes and to which it is to be sealed, a barrel joined to said wall, a sealing sleeve supported in said barrel, said sleeve embracing but not gripping said shaft, said barrel forming a liquid supply chamber about a portion of the sleeve, said sleeve having ports with walls substantially tangential to the surface of the shaft, said ports opening at their outer ends into said latter chamber and at their inner ends into the space between the shaft and the bore of the sleeve, said shaft upon rotation tending to drag liquid in the direction of rotation of the shaft into wedging engagement between the shaft and the wall of the sleeve, means to admit liquid to the supply chamber, one end of the sleeve opening inside the aforesaid wall into the closed chamber and the other end opening outside the wall, said barrel providing a discharge chamber inside the aforesaid wall adjacent the end of the sleeve which extends outside the said wall, and liquid relief ports extending from the bore of the sleeve into said discharge chamber, said discharge chamber having a drain passageway leading outside said wall.

7. In combination, a vertical impeller shaft, a closed chamber having a wall through which said shaft passes and to which it is to be sealed, a barrel joined to said wall, a sealing sleeve supported in said barrel, said sleeve embracing but not gripping said shaft, said barrel forming a chamber about a portion of the sleeve, said sleeve having ports with walls substantially tangential to the surface of the shaft, said ports opening at their outer ends into said chamber and at their inner ends into the space between the shaft and the bore of the sleeve, said shaft upon rotation tending to drag liquid in the direction of rotation of the shaft into wedging engagement between the shaft and the wall of the sleeve, and means to admit liquid to the chamber, one end of the sleeve opening inside the aforesaid wall and the other end opening outside the wall.

8. In a liquid shaft seal suitable for excluding air from the intake side of a centrifugal pump, the combination of a vertical impeller shaft, and a sleeve adapted to communicate at its inner end with the suction side of the impeller, said sleeve embracing but not fitting against said shaft, said sleeve comprising a passageway for introducing liquid into engagement with the shaft, said shaft and said passageway providing a tapering space between them into which tapering space the shaft drives the liquid into wedging engagement between an adjacent part of the sleeve and the shaft by the drag of the shaft upon the liquid in the direction of rotation of the shaft.

9. In a liquid shaft seal suitable for excluding air from the intake side of a centrifugal pump, the combination of a vertical impeller shaft, a sleeve adapted to communicate at its inner end with the suction side of the impeller, said sleeve embracing but not fitting against said shaft, said sleeve having an opening intermediate its ends for introducing liquid into engagement with the shaft, said shaft and the walls of said opening providing a tapering space between them into which tapering space the shaft drives the liquid in the direction of rotation of the shaft into wedging engagement between a part of the sleeve and the shaft, and entry and exit ducts cooperating with said sleeve to provide a circulation of liquid to and from the part of the sleeve having said opening.

HARRY E. LA BOUR.